United States Patent
Shirai et al.

(10) Patent No.: US 9,847,556 B2
(45) Date of Patent: Dec. 19, 2017

(54) METHOD FOR MANUFACTURING FILM-PACKAGED CELL

(71) Applicants: NISSAN MOTOR CO., LTD., Yokohama-Shi, Kanagawa (JP); Automotive Energy Supply Corporation, Zama-Shi, Kanagawa (JP)

(72) Inventors: Satoshi Shirai, Kanagawa (JP); Nobuaki Akutsu, Kanagawa (JP); Takuya Takatsuka, Kanagawa (JP)

(73) Assignees: Nissan Motor Co., Ltd., Yokohama-shi, Kanagawa (JP); Automotive Energy Supply Corporation, Zama-shi, Kanagawa (JP)

( * ) Notice: Subject to any disclaimer, the term of this patent is extended or adjusted under 35 U.S.C. 154(b) by 0 days.

(21) Appl. No.: 15/035,559

(22) PCT Filed: Oct. 16, 2014

(86) PCT No.: PCT/JP2014/077525
§ 371 (c)(1),
(2) Date: May 10, 2016

(87) PCT Pub. No.: WO2015/068548
PCT Pub. Date: May 14, 2015

(65) Prior Publication Data
US 2016/0294014 A1    Oct. 6, 2016

(30) Foreign Application Priority Data

Nov. 11, 2013 (JP) .................. 2013-232673

(51) Int. Cl.
*H01M 10/0585* (2010.01)
*H01M 2/02* (2006.01)
(Continued)

(52) U.S. Cl.
CPC ....... *H01M 10/0585* (2013.01); *H01M 2/021* (2013.01); *H01M 2/024* (2013.01);
(Continued)

(58) Field of Classification Search
CPC ........... H01M 10/0585; H01M 2/0275; H01M 2/0287; H01M 2/08; H01M 2/36;
(Continued)

(56) References Cited

U.S. PATENT DOCUMENTS

2008/0233468 A1    9/2008   Otohata et al.

FOREIGN PATENT DOCUMENTS

EP      1045463 A1    10/2000
EP      1396037 A2    3/2004
(Continued)

*Primary Examiner* — Helen O Conley
(74) *Attorney, Agent, or Firm* — Young Basile Hanlon & MacFarlane, P.C.

(57) ABSTRACT

A film-packaged cell has a flat rectangular shape where power-generating element is housed in packaging body together with an electrolytic solution, the film-packaged cell being sealed along four edges of the packaging body in a state where terminals are led out through one edge thereof. In an electrolyte injection step, the electrolytic solution is injected into bag-shaped body where three edges excluding the upper edge of the packaging body are sealed in an orientation where the terminals are protruding laterally, the electrolytic solution being injected from the side of the opening upper edge. In a partial sealing step performed before the electrolyte injection step, only one section of opening upper edge of the bag-shaped body near edge through which terminals are led out is partially sealed, thereby preventing the electrolytic solution from leaking out during electrolyte injection.

6 Claims, 8 Drawing Sheets

(51) Int. Cl.
- H01M 2/36 (2006.01)
- H01M 2/06 (2006.01)
- H01M 2/30 (2006.01)
- H01M 4/04 (2006.01)
- H01M 4/131 (2010.01)
- H01M 4/133 (2010.01)
- H01M 4/1391 (2010.01)
- H01M 4/1393 (2010.01)
- H01M 10/0525 (2010.01)
- H01M 2/08 (2006.01)
- H01M 10/052 (2010.01)
- H01M 4/02 (2006.01)

(52) U.S. Cl.
CPC ....... *H01M 2/0275* (2013.01); *H01M 2/0287* (2013.01); *H01M 2/06* (2013.01); *H01M 2/30* (2013.01); *H01M 2/305* (2013.01); *H01M 2/36* (2013.01); *H01M 4/0404* (2013.01); *H01M 4/0435* (2013.01); *H01M 4/131* (2013.01); *H01M 4/133* (2013.01); *H01M 4/1391* (2013.01); *H01M 4/1393* (2013.01); *H01M 10/0525* (2013.01); *H01M 2/08* (2013.01); *H01M 10/052* (2013.01); *H01M 2004/027* (2013.01); *H01M 2004/028* (2013.01)

(58) Field of Classification Search
CPC .... H01M 10/052; H01M 2/021; H01M 2/024; H01M 2/06; H01M 2/30; H01M 2/305; H01M 4/0404; H01M 4/0435; H01M 4/131; H01M 4/133; H01M 4/1391; H01M 4/1393; H01M 10/0525
See application file for complete search history.

(56) References Cited

FOREIGN PATENT DOCUMENTS

| | | | | |
|---|---|---|---|---|
| JP | 2001-102090 A | | 4/2001 | |
| JP | 2002-246068 A | | 8/2002 | |
| JP | 2003-007344 | * | 1/2003 | ............ H01M 10/40 |
| JP | 2006-054099 A | | 2/2006 | |
| JP | 2007059144 A | | 3/2007 | |
| JP | 2010067422 A | | 3/2010 | |

* cited by examiner

METHOD FOR MANUFACTURING FILM-PACKAGED CELL

CROSS REFERENCE TO RELATED APPLICATION

The present application claims priority to Japanese Patent Application No. 2013-232673 filed on Nov. 11, 2013, the entire content of which is herein incorporated by reference.

TECHNICAL FIELD

The present invention relates to a film-packaged cell provided to include a laminated film or the like as a packaging body and have a flat shape, and more particularly to a manufacturing method where an electrolytic solution is injected into the interior of the packaging body.

BACKGROUND

As discussed in Japanese Patent Application Publication No. 2001-102090, a film-packaged cell in which a power-generating element (produced by laminating a positive electrode plate and a negative electrode plate through a separator) is housed in a flat rectangular packaging body together with an electrolytic solution has been known, the film-packaged cell being sealed along the four edges of the packaging body in a state where terminals are led out through one side thereof. In the manufacturing process for this kind of film-packaged cell, the electrolytic solution is ordinarily injected into a bag-shaped body in which three edges excluding the upper edge of the packaging body are sealed in an orientation where the terminals are protruding laterally, the electrolyte being injected from the side of the opening upper edge. The unsealed upper edge is sealed after the injection thereby producing a film-packaged cell.

Though the electrolytic solution injected from the side of the opening upper edge of the bag-shaped body is to flow downwardly while penetrating through gaps between the bag-shaped body and the power-generating element housed therein, it becomes difficult to flow downwardly in the vicinity of the one side through which the terminals are led out, because an elongated portion etc. for connecting the terminals to the positive and negative electrode plates exists there so as to narrow the gap and reduce the cross sectional area of the flow passage as compared with the vicinity of the opposite side through which terminals are not led out. Hence there is a fear that the electrolytic solution leaks out during the injection of the electrolytic solution from the upper edge in the vicinity of the one edge through which the terminals are led out.

If the electrolytic solution leaks out, there may arise a fear that the injection of the electrolytic solution is not enough. Additionally, once the electrolytic solution adheres to the terminals or the packaging body, a fear of deterioration in quality may arise; for example, defects in welding may occur when producing an assembled battery.

SUMMARY

The present invention was made in view of the above circumstances, the object of which is to provide a method for manufacturing a novel film-packaged cell capable of preventing a leakage of the electrolytic solution during injection.

A film-packaged cell, an object for manufacturing according to the present invention, is arranged such that a power-generating element produced by laminating a positive electrode plate and a negative electrode plate through a separator is housed in a flat rectangular packaging body together with an electrolytic solution, the power-generating element being sealed along four edges of the packaging body in a state where terminals are led out through one edge thereof.

A manufacturing method for a film-packaged cell according to the present invention is provided to involve: an electrolyte injection step for injecting an electrolytic solution into a bag-shaped body in which three edges excluding an upper edge of the packaging body are sealed in an orientation where the terminals are protruding laterally, through the opening upper edge; and a partial sealing step conducted before the electrolyte injection step for partially sealing the opening upper edge of the bag-shaped body only at a section disposed in the vicinity of the edge through which the terminals are led out.

According to the present invention, the opening upper edge of the bag-shaped body into which the electrolytic solution is injected is partially sealed only at a section disposed so close to the terminals as to apt to cause an electrolyte leakage; therefore it is possible to effectively prevent the electrolyte leakage without inhibiting the electrolyte injection.

DETAILED DESCRIPTION OF THE EMBODIMENTS

Referring now to the accompanying drawings, preferable embodiments of the present invention will be discussed in detail. First of all, with reference to FIGS. 1 and 2, film-packaged cell 1 (an object for manufacturing according to the present invention) will be discussed as an example. Film-packaged cell 1 e.g. a lithium ion secondary battery has a flat rectangular external shape as shown in FIG. 1, and equipped with a pair of positive and negative electrode terminals 2, 3 formed of a conductive metal foil at a longitudinal one end.

Figure 1:
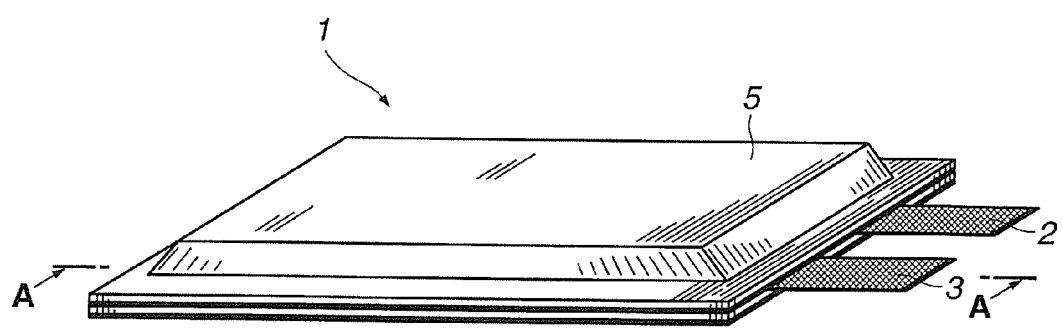
FIG. 1 is a perspective view of a film-packaged cell (an object for manufacturing according to the present invention) as an example.
Figure 2:
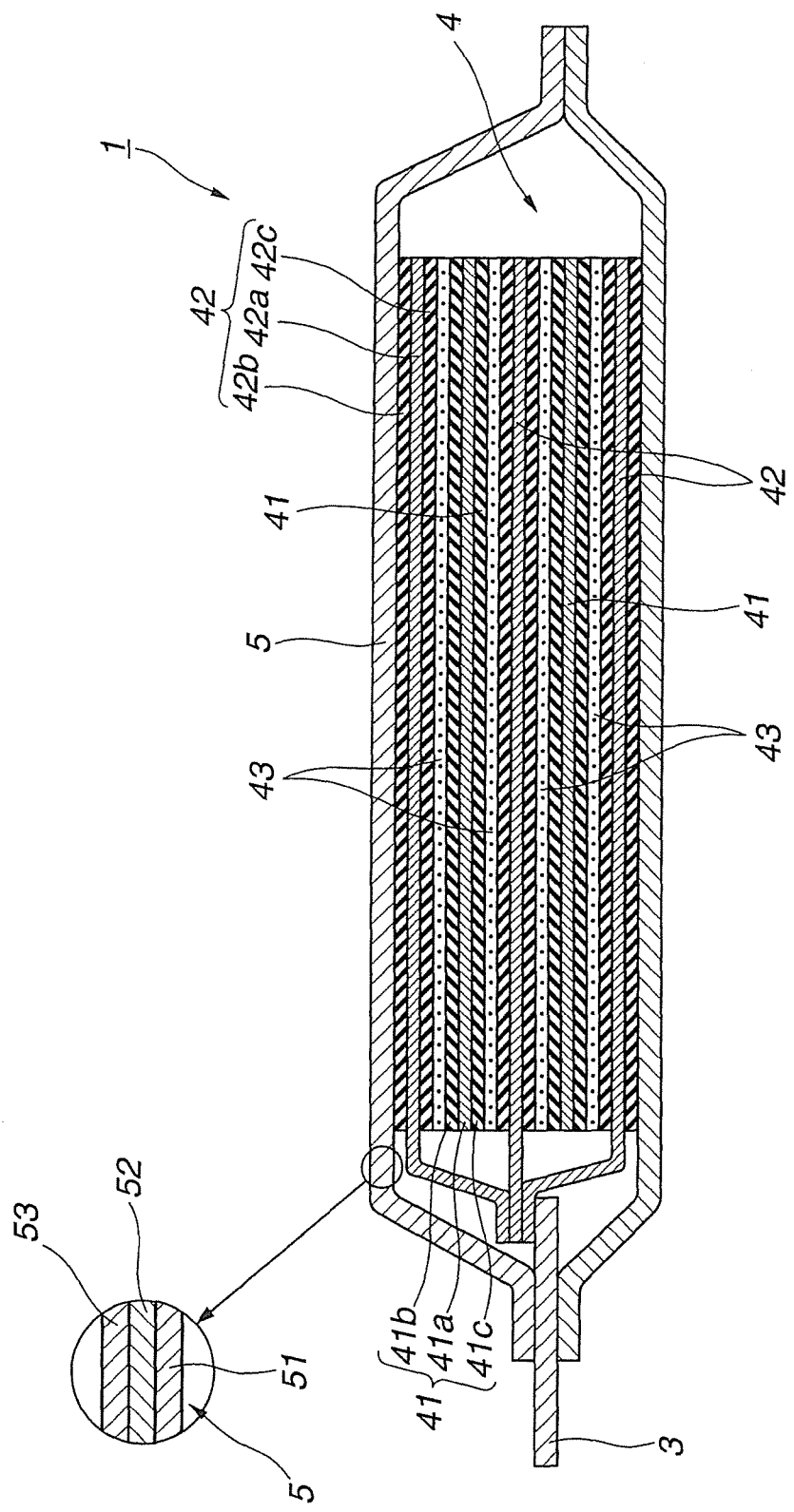
FIG. 2 is a cross-sectional view of the film-packaged cell, taken along the line A-A of FIG. 1.

FIG. 2 illustrates a cross section of film-packaged cell 1, taken along a section line indicated in FIG. 1 by the line A-A. As shown in FIG. 2, film-packaged cell 1 is provided to include: packaging body 5 formed of a laminated film; and rectangularly-shaped power-generating element 4 housed inside packaging body 5 together with an electrolytic solution. Power-generating element 4 is formed having a plurality of positive electrode plates 41 and negative electrode plates 42, the positive and negative electrode plates 41, 42 being laminated alternately through separators 43. For example, it is provided including three negative electrode plates 42, two positive electrode plates 41, and four separators 43 disposed between these plates. More specifically, in this case, negative electrode plates 42 are located to behave as both sides of power-generating element 4. However, an arrangement where positive electrode plate 41 is disposed at the outermost layer of power-generating element 4 is also acceptable. Incidentally, the size of each of the parts as shown in FIG. 2 is not necessarily correct, or rather exaggerated for explanation.

Positive electrode plate 41 is provided by forming positive electrode active material layers 41b, 41c on both sides of rectangularly-shaped positive electrode collector 41a. Positive electrode collector 41a is formed of an electrochemically stable metal foil such as aluminum foil, aluminum alloy foil, copper foil, nickel foil or the like. Additionally, positive electrode active material layers 41b, 41c are produced, for example, by applying a mixture of a positive electrode active material formed of lithium composite oxide such as lithium nickelate ($LiNiO_2$), lithium manganate ($LiMnO_2$) and lithium cobaltate ($LiCoO_2$), a conductive assistant such as carbon black, and a binder to the principal surface of positive electrode collector 41a, followed by drying and rolling.

Negative electrode plate 42 is provided by forming negative electrode active material layers 42b, 42c on both sides of rectangularly-shaped negative electrode collector 42a. Negative electrode collector 42a is formed of an electrochemically stable metal foil such as nickel foil, copper foil, stainless steel foil, iron foil or the like. Negative electrode active material layers 42b, 42c are produced, for example, by applying a mixture of a binder and a negative electrode active material (capable of occluding and releasing lithium ions of the above-mentioned positive electrode active material, such as amorphous carbon, hardly graphitizable carbon, easily graphitizable carbon and graphite) to the principal surface of negative electrode collector 42a, followed by drying and rolling.

A part of a longitudinal one end of negative electrode collector 42a is formed extending beyond negative electrode active material layers 42b, 42c to serve as an elongated portion, the tip end of which is joined to negative electrode terminal 3. Likewise, a part of a longitudinal one end of positive electrode collector 41a is formed extending beyond positive electrode active material layers 41b, 41c to serve as an elongated portion, the tip end of which is joined to positive electrode terminal 2, though not shown in FIG. 2.

The above-mentioned separator 43 has the function of preventing a short circuit between positive electrode plate 41 and negative electrode plate 42 while holding an electrolyte. It is constructed from a fine porous film formed of polyolefins such as polyethylene (PE) and polypropylene (PP), for example. Additionally, when an overcurrent passes therethrough, pores in the film are blocked by the generated heat thereby exhibiting the function of interrupting the current. Incidentally, separator 43 is not limited to a single film formed of polyolefins or the like and therefore it is also acceptable to employ a separator having a three-layer structure where a polypropylene film is sandwiched between polyethylene films or a separator obtained by laminating a polyolefin fine porous film and an organic nonwoven fabric etc.

Since the electrolytic solution is not particularly limited, it is possible to adopt electrolytic solutions generally used in a lithium ion secondary battery, such as a nonaqueous electrolyte in which a lithium salt is dissolved in an organic solvent.

Packaging body 5 housing the thus arranged power-generating element 4 together with the electrolytic solution is formed from a laminated film having a three-layer structure composed of heat-sealable layer 51, metal layer 52 and protective layer 53. Metal layer 52, which serves as an intermediate layer, is formed of aluminum foil, for example. Heat-sealable layer 51 covering the inner surface of the metal layer 52 is formed of a heat-sealable synthetic resin e.g. polypropylene (PP). Protective layer 53 covering the outer surface of the metal layer 52 is formed of a highly durable synthetic resin e.g. polyethylene terephthalate (PET). Incidentally, the laminate film may be one including a greater number of layers. Though the both surfaces of metal layer 52 in the above case are laminated with synthesis resins, the one laminated at the outside of metal layer 52 is not necessarily required and therefore metal layer 52 may be arranged to include only one synthesis resin layer at its inner surface.

Packaging body 5 in one example as shown in FIG. 2 has a two-layer structure consisting of: one sheet of laminated film disposed on the bottom side of power-generating element 4; and another sheet of laminated film disposed on the top side of power-generating element 4. These two laminated films are superimposed along their peripheral four sides and heat-sealed with each other. The illustrated example shows packaging body 5 having such a two-layer structure. In another example, packaging body 5 is composed of a relatively large one sheet of laminated film folded in two and disposing power-generating element 4 therein, the peripheral three edges of which are superimposed and heat-sealed with each other.

A pair of positive and negative electrode terminals 2, 3 located on the short edge of the rectangular shape of film-packaged cell 1 are led out through the joined surface of the laminated film at the time of heat-sealing the laminated film.

Figure 3:
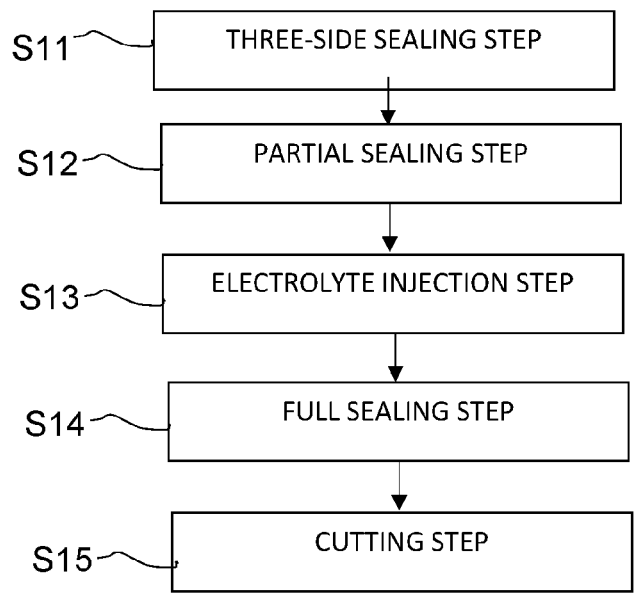
FIG. 3 is an explanatory view schematically showing a part of manufacturing process for the film-packaged cell.
Figure 4:
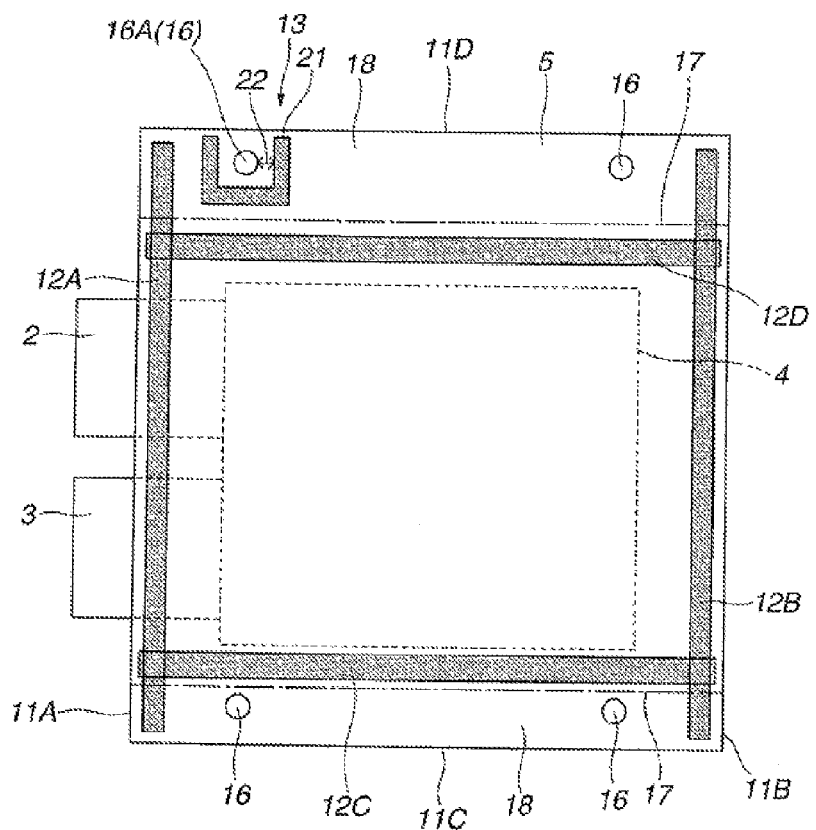
FIG. 4 is a plan view of a bag-shaped body according to a first embodiment of the present invention.

Hereinafter, manufacturing procedures for the above-mentioned film-packaged cell 1 will be briefly discussed. FIG. 3 is schematically illustrates a part of the manufacturing process. First, positive electrode plate 41, negative electrode plate 42 and separator 43 are sequentially laminated while attaching positive electrode collector 41a and negative electrode collector 42a to positive and negative electrode terminals 2, 3 by spot welding, ultrasonic welding or the like, thereby constructing power-generating element 4. In the subsequent step named three-side sealing step S11, power-generating element 4 is covered with a laminated film serving as packaging body 5 as shown in FIG. 4, and then four peripheral edges 11A to 11D, and more specifically three peripheral edges 11A to 11C (excluding long edge 11D from a pair of short edges 11A, 11B including edge 11A on which terminals 2, 3 are provided and a pair of long edges 11C, 11D on which terminals 2, 3 are not provided) are heat-sealed at the locations of sealing lines 12A to 12C linearly extending along the three edges 11A to 11C. With this, packaging body 5 is formed into bag-shaped body 13 open at edge 11D.

Figure 5:
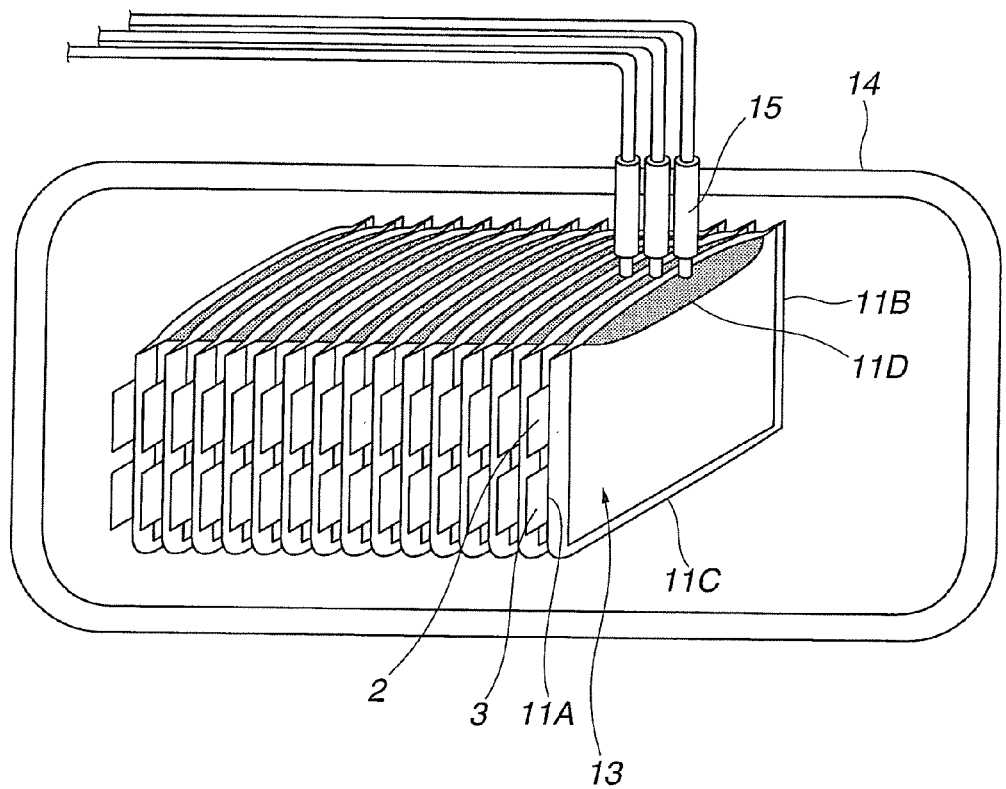
FIG. 5 is an explanatory view schematically showing an apparatus used in an electrolyte injection step.
Figure 6:
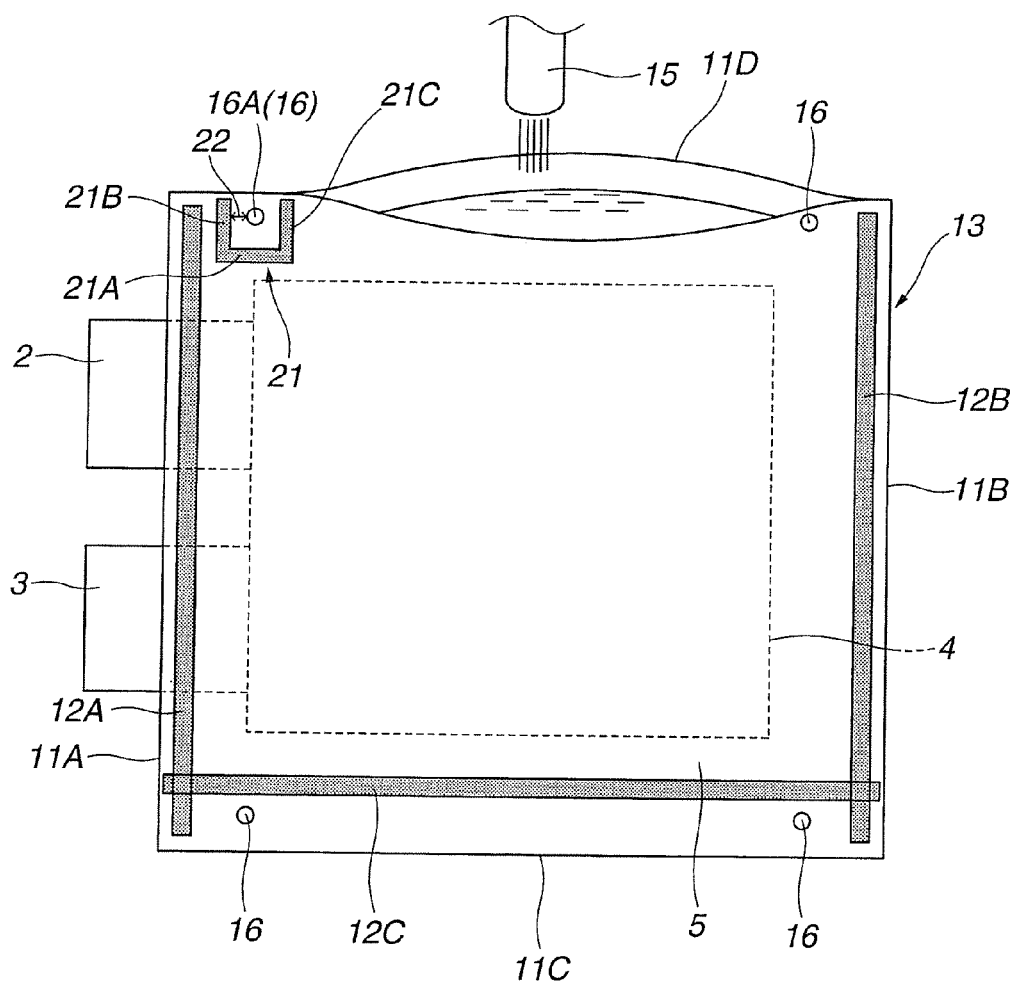
FIG. 6 is a plan view of the bag-shaped body in the electrolyte injection step.

Then, a step named electrolyte injection step S13 and follows the undermentioned partial sealing step S12 will be discussed. In electrolyte injection step S13, an electrolytic solution is injected from the side of opening edge 11D (an upper edge) as shown in FIGS. 5 and 6, within casing 14 in a vacuum state. To be more specific, a plurality of bag-shaped bodies 13 are held in a posture where terminals 2, 3 are protruding laterally while opening edge 11D is located on the upper side to behave as upper edge 11D, and the electrolytic solution is injected from the opening upper edge 11D by using injection nozzles 15.

The opening upper edge 11D is heat-sealed in step S14 after the injection of the electrolytic solution along sealing line 12D (as shown in FIG. 4) thereby bringing packaging body 5 into a sealed state. The thus completed film-packaged cell 1 is then charged up to an appropriate level, followed by being subjected to aging and the like for a fixed period of time while keeping this state.

As shown in FIG. 4, bag-shaped body 13 used in the manufacturing process is provided to have at its four locations four piercing holes named locator holes 16 into which four locator pins (not shown) fixed onto palette 28 (shown in FIG. 9) are to be inserted during heat sealing for keeping the two sheets of laminated film at a fixed position. However, in bag-shaped body 13, edge portions of long edges 11C, 11D are cut along cut line 17 in step S15 disposed inside locator holes 16 and outside sealing lines 12C, 12D, so that scrap sections 18 including locator holes 16 are cut away and therefore locator holes 16 do not finally remain on film-packaged cell 1.

Incidentally, this kind of film-packaged cell 1 is usable as a battery module where an assembled battery obtained by electrically connecting two or more cells to each other is housed in a flat box-like casing.

Figure 7:
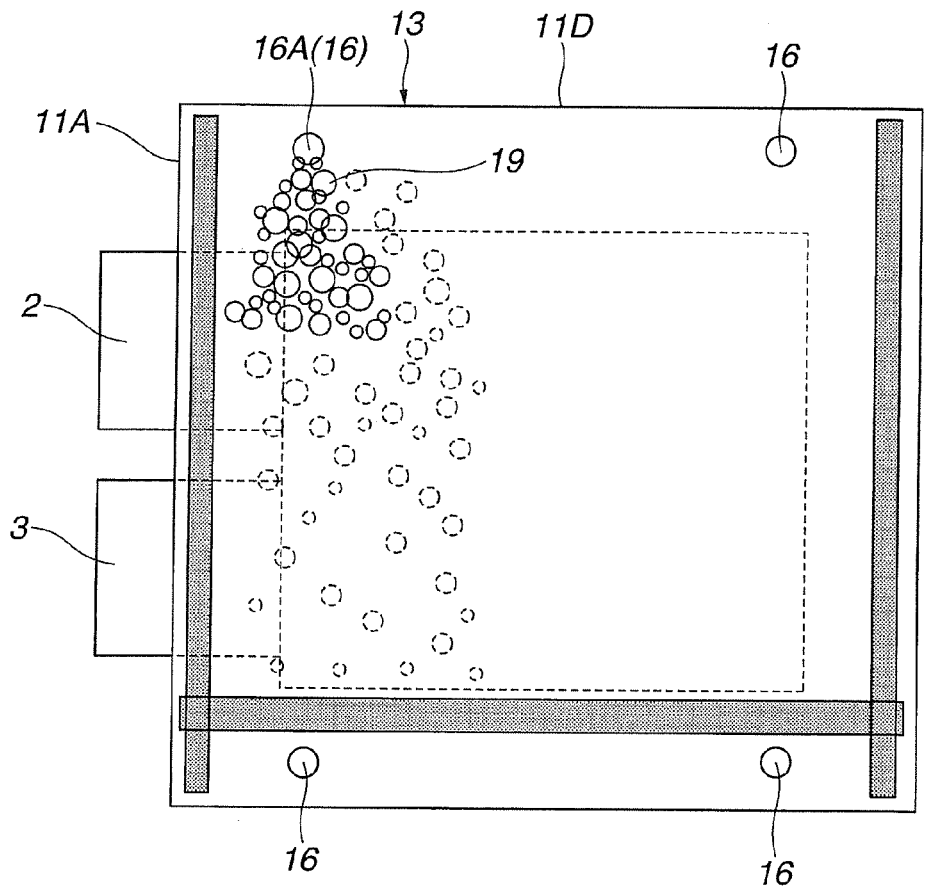
FIG. 7 is an explanatory view for explaining a malfunction where an electrolytic solution leaks out.

Referring now to FIG. 7, a malfunction of an electrolyte leakage in electrolyte injection step S13 will be discussed. When injecting an electrolytic solution from opening upper edge 11D into bag-shaped body 13, the electrolytic solution injected through injection nozzles 15 is to flow downwardly while penetrating through gaps between bag-shaped body 13 and power-generating element 14. However, on the side of edge 11A equipped with terminals 2, 3 (i.e. the left side of FIG. 2), there exist not only terminals 2, 3 but also elongated portions of positive electrode plate 41 and negative electrode plate 42 connected to the terminals as shown in FIG. 2, so as to narrow the gap and lessen the cross sectional area of the flow passage as compared with the opposite side not equipped with terminals 2, 3 (i.e. the right side of FIG. 2). Accordingly, as shown in FIG. 7, penetration of the electrolytic solution in the vicinity of edge 11A equipped with terminals 2, 3 is to slow down during the electrolyte injection. In other words, the electrolytic solution comes to have difficulty in smoothly downwardly flowing, which may cause a fear that the electrolytic solution leaks out from the upper edge 11D.

Figure 8:
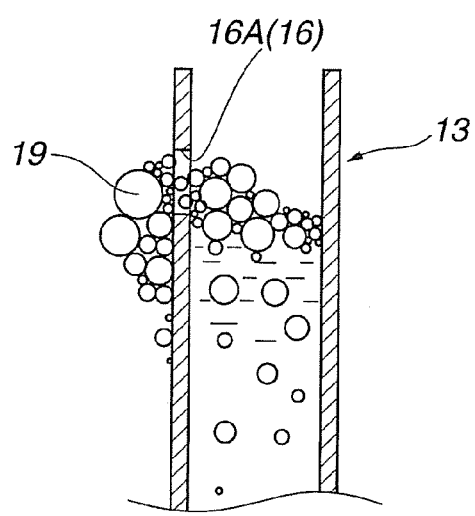
FIG. 8 is a cross-sectional view of a locator hole and its vicinity, for explaining the malfunction where the electrolytic solution leaks out similarly to FIG. 7.

Particularly in the case where locator holes 16 for positioning purpose are formed piercing four corners of bag-shaped body 13 as discussed above, bubbling electrolytic solution 19 boiled under a vacuum atmosphere is apt to leak from upper locator hole 16A disposed on the side close to terminals 2, 3 as shown in FIGS. 7 and 8. If the electrolytic solution thus causes leakage, the injection of the electrolytic solution may become insufficient, and additionally there may arises a fear of deterioration in quality; for example, when producing an assembled battery through a means of welding terminals 2, 3 of a plurality of film-packaged cells 1 to each other, defects in welding may occur.

In view of the above, an embodiment of the present invention as shown in FIG. 3 is arranged to involve partial sealing step S12 after three-side sealing step S11 and before electrolyte injection step S13, the partial sealing step S12 being performed for partially sealing sealed section 21 only (which is a part close to opening upper edge 11D and edge 11A through which terminals 2, 3 are led out, and this part is disposed closer to edge 11A than an electrolyte injection position).

In partial sealing step S12, sealed section 21 is formed in a manner to enclose the periphery of upper locator hole 16A (disposed on the side of edge 11A through which terminals 2, 3 are led out) as shown in FIGS. 4 and 6, the sealed section 21 including at least lower section 21A corresponding to a section disposed underneath locator hole 16A.

Particularly in the first embodiment, sealed section 21 is shaped into a channel or a letter U to enclose locator hole 16A from three directions with lower section 21A and both-side sections 21B, 21C. Since locator hole 16A is disposed inside sealing line 12A extending along edge 11A (the edge close to terminals 2, 3), sealed section 21 is also formed inside sealing line 12A. In order not to block locator hole 16A with burrs formed by heat sealing, there is certainly provided a predetermined clearance 22 between sealed section 21 and locator hole 16A.

By providing sealed section 21 around upper locator hole 16A disposed on the side close to terminals 2, 3, it surely becomes possible to prevent the electrolytic solution from leaking from locator hole 16A. Moreover, sealed section 21 is locally provided only to a part of opening upper edge 11D, the part on the side close to terminals 2, 3, so that the remaining part of upper edge 11D can take on a widely opening shape and therefore never inhibits the injection of the electrolytic solution.

Particularly in the first embodiment, sealed section 21 has such a shape as to enclose locator hole 16A from three directions with lower section 21A and both-side sections 21B, 21C, which certainly makes it possible to prevent the electrolytic solution from entering locator hole 16A from below and side.

Figure 9:
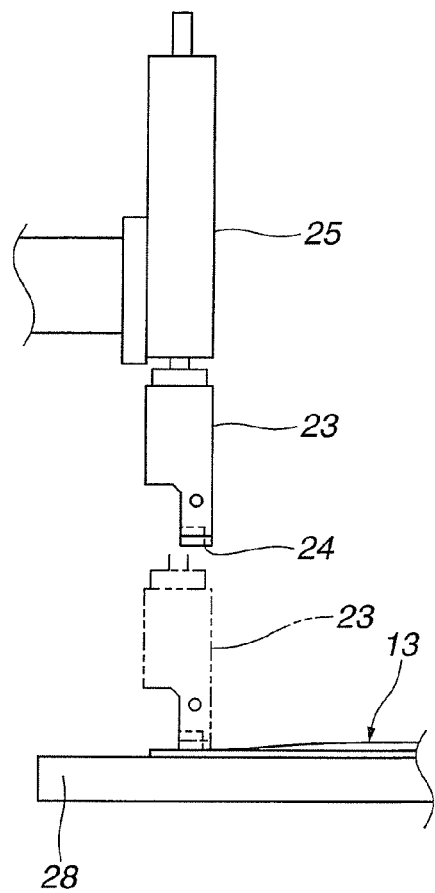
FIG. 9 is a side view of an apparatus used in a partial sealing step.
Figure 10:
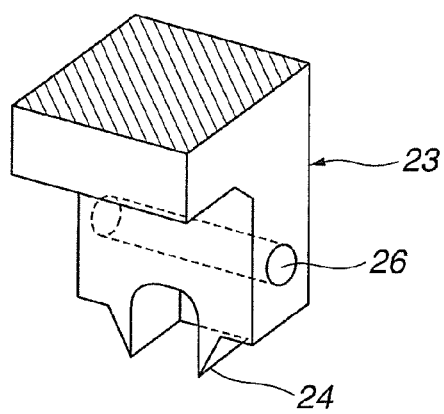
FIG. 10 is a partially broken perspective view showing a heater block of the apparatus used in the partial sealing step.

FIGS. 9 and 10 illustrate an example of an apparatus used in the above-mentioned partial sealing step S12. This apparatus is arranged to include heater block 23 where tip end 24 is shaped corresponding to the shape of sealed section 21 (i.e. a channel-like or U-like shape), and cylinder 25 for driving heater block 23 in a given direction (or a vertical direction in FIG. 9). In heater block 23, cartridge heater 26 as heat source is embedded as shown in FIG. 10. By conducting heating on bag-shaped body 13 (packaging body 5) mounted on palette 28 while pressing tip end 24 of heater block 23 driven by cylinder 25 onto an appropriate position of packaging body 5 (i.e. a position around locator hole 16A), sealed section 21 is heat-sealed.

Figure 11:
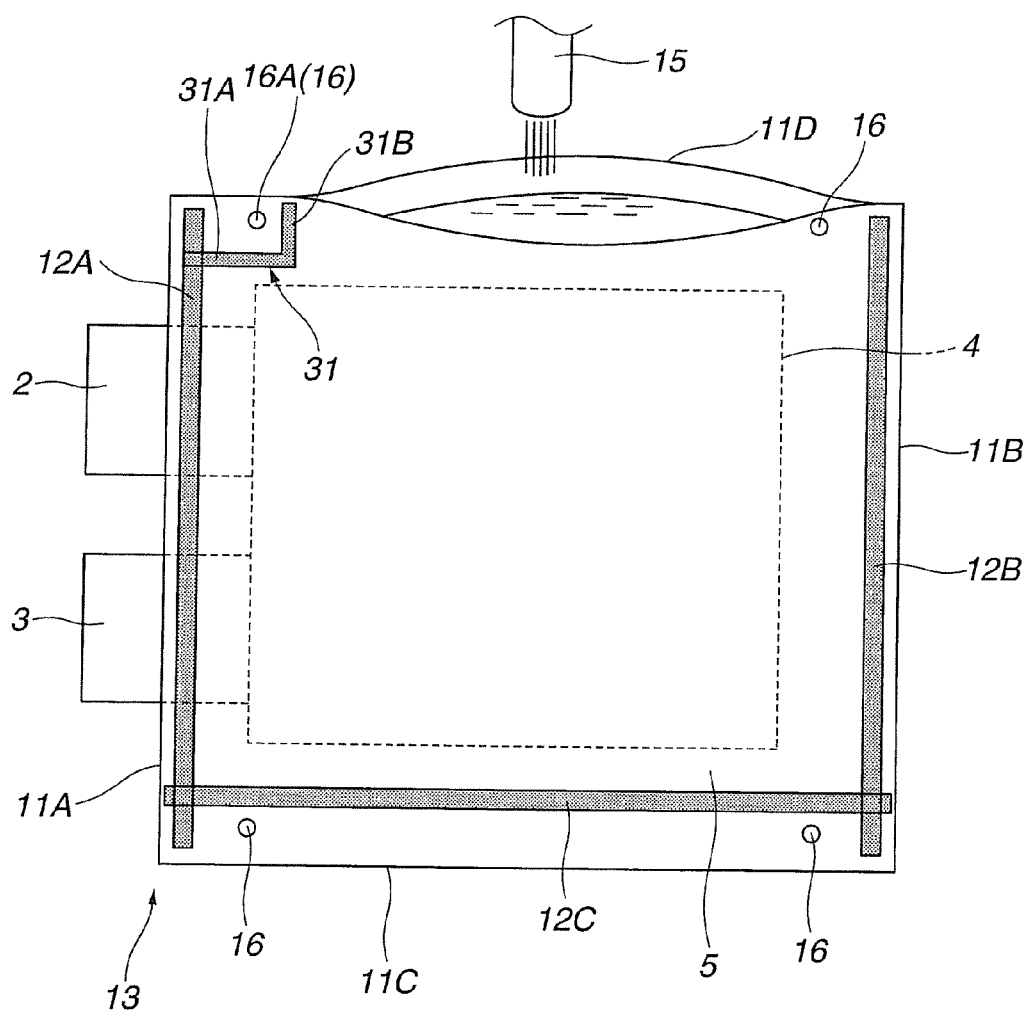
FIG. 11 is a plan view of a bag-shaped body according to a second embodiment of the present invention, the bag-shaped body being in the electrolyte injection step.

FIG. 11 illustrates a second embodiment of the present invention. In the second embodiment, the shape of sealed section 31 is different from that in the first embodiment. More specifically, sealed section 31 to be sealed through partial sealing step S12 is shaped like a letter L composed of: lower section 31A disposed underneath locator hole 16A; and side section 31B disposed farther from edge 11A through which terminals 2, 3 are led out. Lower section 31A of sealed section 31 is located perpendicular to sealing line 12A extending along edge 11A through which terminals 2, 3 are led out. As a result, locator hole 16A is enclosed from three directions (at a bottom section and both-side sections) with L-shaped sealed section 31 and a part of sealing line 12A. With this, it surely becomes possible to protect locator hole 16A from the electrolytic solution entering from below and side, similar to the above-mentioned first embodiment.

Although the present invention has been discussed above by reference to some specific embodiments, the present invention is not limited to those embodiments and involves many modifications and variations. For example, the shape of sealed section is not limited to those of the first and second embodiments and therefore a circular or semicircular one enclosing the locator hole is also acceptable. Furthermore, the sealed section may be one sealing only the lower section disposed under the locator hole.

Though partial sealing step S12 in the above embodiment is performed between three-side sealing step S11 and electrolyte injection step S13, the partial sealing step may be acceptable as far as performed before the electrolyte injection step. For example, it is possible to perform the partial sealing step concurrently with or before the three-side sealing step.

Additionally, though either or the above embodiments is arranged to prevent the electrolyte leakage from locator hole 16A disposed in the vicinity of edge 11A equipped with terminals 2, 3, the present invention is not limited to such arrangements. If short edges 11A, 11B of packaging body 5 in the electrolyte injection step are so short as not to ensure a sufficient distance from the opening edge of packaging body 5 to power-generating element 4 housed therein, there is a possibility that the electrolytic solution leaks out from the opening edge of packaging body 5 in the vicinity of edge 11A equipped with terminals 2, 3 even in a case where locator hole 16A is not formed. Even in such a case, the electrolyte leakage from the opening edge can be prevented as in the above-mentioned embodiments by sealing a part of the opening edge of bag-shaped packaging body 5 at the vicinity of edge 11A equipped with terminals 2, 3.

The invention claimed is:

1. A manufacturing method for a film-packaged cell in which a power-generating element produced by laminating a positive electrode plate and a negative electrode plate through a separator is housed in a flat rectangular packaging body together with an electrolytic solution and sealed along upper and lower edges and first and second side edges of the packaging body in a state where terminals are led out through the first side edge thereof, the manufacturing method for a film-packaged cell comprising:
an electrolyte injection step for injecting an electrolytic solution into a bag-shaped body in which the first and second side edges and the lower edge excluding the upper edge of the packaging body are sealed in an orientation where the terminals protrude laterally from the first side edge, through the open upper edge; and
a partial sealing step conducted before the electrolyte injection step for partially sealing the open upper edge of the bag-shaped body only at a first seal section disposed in a vicinity of the first side edge through which the terminals are led out, wherein in the electrolyte injection step, the electrolytic solution is injected in a vacuum state,
wherein a rest of the upper edge except the first seal section is substantially longer than a width of an injection nozzle for injecting the electrolyte solution, such that the rest of the upper edge is open even during the injection of the electrolytic solution from the injection nozzle.

2. A manufacturing method for a film-packaged cell in which a power-generating element produced by laminating a positive electrode plate and a negative electrode plate through a separator is housed in a flat rectangular packaging body together with an electrolytic solution and sealed along four edges of the packaging body in a state where terminals are led out through one edge thereof, the manufacturing method for a film-packaged cell comprising:
an electrolyte injection step for injecting an electrolytic solution into a bag-shaped body in which three edges excluding an upper edge of the packaging body are sealed in an orientation where the terminals are protruding laterally, through the opening upper edge; and
a partial sealing step conducted before the electrolyte injection step for partially sealing the opening upper edge of the bag-shaped body only at a section disposed in the vicinity of the edge through which the terminals are led out, wherein the bag-shaped body is pierced at its four corners to form locator holes for positioning purpose, and in the partial sealing step the periphery of one locator hole is partially sealed to include at least a lower section disposed underneath the locator hole.

3. The manufacturing method for a film-packaged cell, as claimed in claim 2, wherein a sealed section subjected to sealing in the partial sealing step encloses the locator hole from three directions with the lower section and both-side sections.

4. The manufacturing method for a film-packaged cell, as claimed in claim 2, wherein a sealed section subjected to sealing in the partial sealing step is shaped into a letter L comprising the lower section disposed underneath the locator hole and a side section disposed farther from the edge through which the terminals are led out, and
the lower section of the sealed section disposed underneath the locator hole is perpendicular to a sealing line extending along the edge through which the terminals are led out.

5. The manufacturing method for a film-packaged cell, as claimed in claim 1, wherein the vicinity of the first side edge through which the terminals are led out is disposed along the open upper edge of the bag-shaped body and closer to the terminals than an electrolyte injection position in the electrolyte injection step.

6. The manufacturing method for a film-packaged cell, as claimed in claim 1, wherein, after the electrolyte injection step, the open upper edge of the bag-shaped body is fully sealed between the first and second side edges at a second seal section that is closer to the terminals than the first seal section of the partial sealing step, and then the bag-shaped body is cut at a position between the first and second seal sections along the upper edge of the bag-shaped body to manufacture the film-packaged cell including the second seal section and excluding the first seal section as a scrap.

* * * * *